US006917040B2

(12) United States Patent
Thierauf et al.

(10) Patent No.: US 6,917,040 B2
(45) Date of Patent: Jul. 12, 2005

(54) METHOD AND APPARATUS FOR RECOGNIZING FOREIGN MATERIAL ON BANK NOTES

(75) Inventors: Klaus Thierauf, München (DE); Jan Domke, München (DE); Jürgen Schützmann, Pfaffenhofen (DE); Bernd Wunderer, München (DE); Ulrich Schanda, Holzkirchen (DE); Hans-Uwe Richter, München (DE); Lukas Löffler, Deisenhofen (DE)

(73) Assignee: Giesecke & Devrient GmbH, Munich (DE)

(*) Notice: Subject to any disclaimer, the term of this patent is extended or adjusted under 35 U.S.C. 154(b) by 170 days.

(21) Appl. No.: 10/413,362

(22) Filed: Apr. 15, 2003

(65) Prior Publication Data

US 2003/0234362 A1 Dec. 25, 2003

(30) Foreign Application Priority Data

Apr. 19, 2002 (DE) ........................................ 102 17 586

(51) Int. Cl.[7] ................................................ G01N 21/71
(52) U.S. Cl. .................................................... 250/341.6
(58) Field of Search .............................. 250/340, 341.1, 250/341.4, 341.6, 341.7, 330, 339.08; 359/2

(56) References Cited

U.S. PATENT DOCUMENTS 3,462,602 A 8/1969 Apple
3,916,690 A * 11/1975 Brandli ........................ 374/129
4,189,235 A * 2/1980 Guter et al. ............. 356/239.1
5,489,778 A 2/1996 Burmester et al.
5,894,126 A * 4/1999 Pompei et al. ........... 250/338.1
5,922,959 A 7/1999 Kayani
6,100,527 A * 8/2000 Pompei et al. ......... 250/339.14
6,198,949 B1 * 3/2001 Braig et al. ................. 600/310
6,340,817 B1 * 1/2002 Gelbart ..................... 250/341.6
2003/0030785 A1 * 2/2003 Christophersen ............. 356/71

FOREIGN PATENT DOCUMENTS

EP 0 797 815 B1 7/1998
JP 10-116369 5/1998
WO 87/00632 1/1987
WO 01/35086 A2 5/2001

* cited by examiner

*Primary Examiner*—David Porta
*Assistant Examiner*—Faye Polyzos
(74) *Attorney, Agent, or Firm*—Bacon & Thomas, PLLC

(57) ABSTRACT

A method and apparatus for recognizing foreign material (2), in particular adhesive objects, glue or joints, on or in bank notes (1), including detecting the thermal radiation (5) emanating from at least a partial area of the bank note (1): and recognizing foreign material (2) located on the bank note (1) on the basis of the detected thermal radiation (5). The invention is especially suitable for recognizing adhesive objects, in particular adhesive tape and joints, on bank notes since areas of a bank note with adhesive tape or joints differ very distinctly in their thermal properties from other areas of the bank note without adhesive tape.

38 Claims, 1 Drawing Sheet

METHOD AND APPARATUS FOR RECOGNIZING FOREIGN MATERIAL ON BANK NOTES

BACKGROUND

A. Field

This invention relates to a method and corresponding apparatus for recognizing foreign material, in particular adhesive objects, glue or joints, on or in bank notes.

B. Related Art

In machine processing of bank notes in commercial or central banks, bank notes are checked for, among other things, their fitness for further use in payment transactions. An important criterion for decision is the presence of undesirable foreign objects on or in the notes. Such undesirable objects are generally objects that are not part of a finished bank note and are applied to or incorporated in the note only during circulation. They are frequently adhesive tape or similar adhesive objects that are stuck to the note in particular for purposes of repair. Occasionally it can happen that bank notes are provided with paper clips or staples for similar or other purposes. Such notes are generally regarded as unfit for further use and must be accordingly recognized, rejected and possibly destroyed during machine processing.

For recognizing undesirable objects on bank notes in bank note processing machines according to the prior art, optical methods are used, for instance, by which the light reflected by a note to be checked or transmitted through the note is detected. The detected light is used to derive statements about the presence of foreign material on the note. However, this method delivers insufficiently precise results in particular in the recognition of thin or transparent adhesive tape, since the reflection and transmission properties in the area of the tape usually do not differ distinctly enough from the other areas of the note without tape.

In other methods, notes under examination are exposed to ultrasound and the sound fraction reflected or transmitted by the note used to calculate the thickness of the note. These methods are also not fully suitable for recognizing adhesive tape on notes since the frequently used commercial adhesive films have very small thickness compared to the paper thickness of the note. The differences of the reflected or transmitted sound in areas with and without adhesive tape are thus accordingly small, so that in particular thin adhesive tape cannot be recognized with sufficient reliability.

It is the problem of the invention to state a method and corresponding apparatus for more reliable recognition of foreign material, in particular undesirable adhesive objects, glue or joints, on bank notes.

SUMMARY OF INVENTION

The inventive method is characterized by the following steps: detecting the thermal radiation emanating from at least a partial area of the bank note, and recognizing foreign material located on or in the bank note on the basis of the detected thermal radiation.

The invention is based on the idea of deriving statements about foreign material possibly present on or in the bank note from the thermal properties of a bank note under examination. The thermal properties of the note are detected via the thermal radiation emanating from the note, the note itself acting as a radiation source that emits the thermal radiation to be detected. This is always the case when there is a temperature difference between the bank note and the detector detecting the thermal radiation. The spectral wavelength range in which thermal radiation is detected is typically between about 3 and 12 microns.

In a preferred embodiment of the invention, the intensity of the detected thermal radiation is used as a measure of the thermal emissivity of the bank note or the foreign material located on or in the bank note. If bank note and foreign material are at the same temperature, i.e. in thermal equilibrium, the intensities of the detected thermal radiation can be readily distinguished in areas of the note with and without foreign material, since the thermal emissivities in the area of the foreign material are different from the emissivities in the other areas of the note.

In a further embodiment, at least a partial area of the bank note under examination is heated or cooled and the thermal radiation emanating from the partial area of the bank note detected. The thermal behavior of the bank note is detected here in dependence on time by detecting the thermal radiation, which is a measure of the particular temperature of the examined area of the note, in one or more time intervals after the after the beginning or end of the heating or cooling process. The temperature differences occurring between the areas with foreign material and the other areas of the bank note are used to infer the presence of foreign material.

The inventive method is especially suitable here for recognizing undesirable adhesive objects, glue or joints on or in bank notes since areas of a note with adhesive objects, glue or joints differ very distinctly in their thermal properties from the other areas of the note. This renders it possible to make more reliable statements about the presence on notes even of adhesive objects that are very thin compared with the note thickness than in optical methods or ultrasonic methods known from the prior art.

Experience has shown that adhesive tape is the adhesive object most frequently occurring on bank notes. However, other undesirable adhesive objects adhering to the note by means of an adhesive layer, such as plastic or paper labels, can likewise be recognized especially reliably by the invention in general.

This effect is initially surprising since the thermal conductivities of plastics used in commercial adhesive tape do not differ essentially from bank note paper. This unexpected behavior can be explained by the fact that small air bubbles are enclosed in the adhesive layer of the tape, which cannot be completely eliminated even if the tape is stuck to the note very carefully. Since air is known to have a thermal conductivity that is about one order of magnitude lower than plastics, thermal conductivity in the area of the tape is distinctly reduced compared to other areas of the note by the inclusions of air in the adhesive layer. This causes the temperature to change significantly more slowly in the area of the tape during or after heating or cooling than in other areas of the note. According to the invention, this temperature behavior is detected and evaluated for recognizing the tape. Analogous considerations apply to paper labels.

The inventive method also permits reliable recognition of joints between individual sections of spliced bank notes. The invention is therefore particularly suitable for recognizing so-called composed bank notes. These are notes that are spliced together from sections of a plurality of authentic notes in such a way as to obtain more counterfeit notes than authentic ones, e.g. eleven counterfeit notes from ten authentic ones. The individual sections are glued together with suitable adhesives in abutting relationship, i.e. at their abutting edges, or by slight overlap. Such forgeries are difficult to distinguish from authentic notes optically. Mechanical test methods or thickness measurements are generally also too inaccurate for reliably recognizing such forgeries.

However, the inventive method can recognize the joints with high reliability since their thermal properties, in particular thermal conductivity and/or emissivity, differ distinctly from other, unglued areas of the note. This effect can be explained, in analogy to the above-described case of adhesive tape, by inclusions of air in the glue located between the individual sections of the spliced note.

All in all, the inventive method and apparatus obtain higher reliability in the recognition of foreign material, in particular adhesive objects, glue and joints, on or in bank notes.

DESCRIPTION OF THE DRAWINGS

The invention will be explained in more detail in the following with reference to the figures, in which:

FIG. 1 shows a first embodiment of the inventive apparatus for recognizing foreign material 2 located on bank note 1 under test.

DETAILED DESCRIPTION

Figure 1:
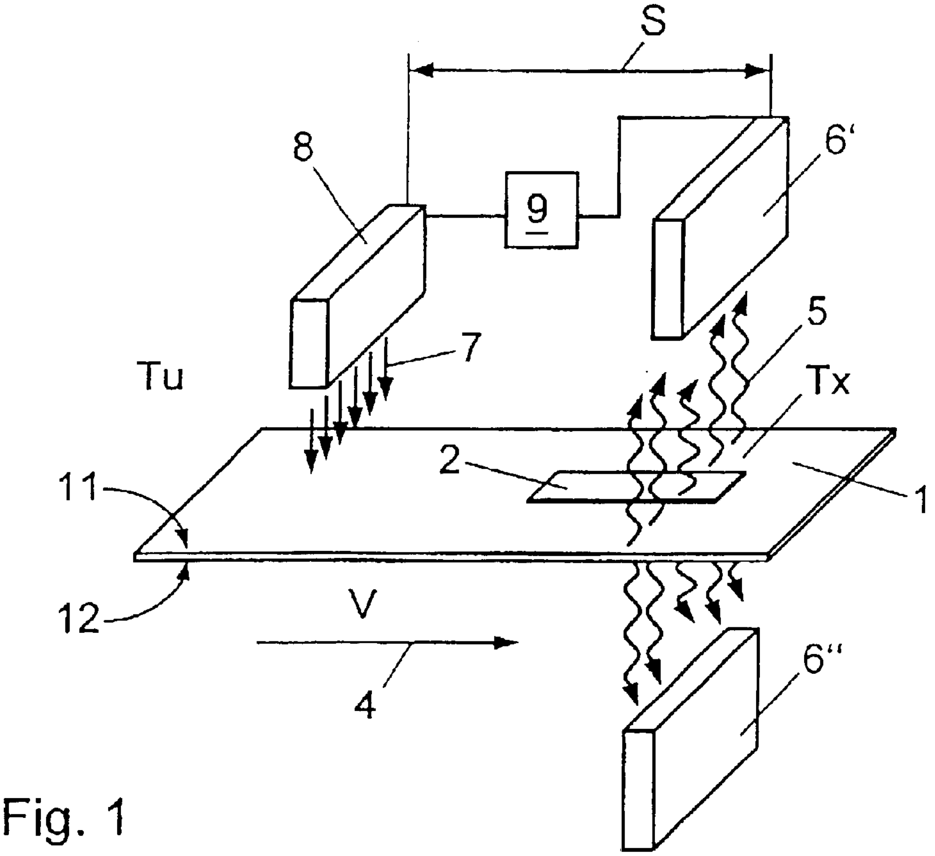
FIG. 1 shows an inventive apparatus in a first embodiment.

In the shown example, foreign material 2 is adhesive tape stuck to the bank note surface and consisting in commercial form of a transparent or opaque plastic film, e.g. of polypropylene, polystyrene or polyethylene, bearing an adhesive layer. Such adhesive tape is frequently stuck to bank notes to repair damage, for example large tears. The inventive apparatus is suitable in general for recognizing a great variety of undesirable objects on bank notes, provided they differ from note 1 in their thermal properties, for example thermal conductivity and/or heat capacity. They may be for example paper clips or staples, but also dirty spots of some thickness.

Note 1 to be checked is transported at certain transport speed V in transport direction 4 marked by a straight arrow past thermal radiation source 8 emitting thermal radiation 7. Thermal radiation source 8 is for example a flash lamp, halogen lamp or a laser with a high share of thermal radiation in the particular emission spectrum.

Thermal radiation 7 incident on note 1 or a partial area of note 1 heats it to a temperature that is different from ambient temperature Tu. The partial area of the bank note can also be understood according to the invention to mean the whole bank note surface. Ambient temperature refers in general to any temperature that bank note 1 approaches after a sufficiently long time period after the end of heating. In particular, this refers to the original temperature of note 1 before its heating or the temperature of the media immediately surrounding note 1.

In the shown example, note 1 is heated by thermal radiation source 8. The inventive method fundamentally works analogously by cooling note 1 to a temperature below ambient temperature Tu. In this case it is ensured, instead of using thermal radiation source 8, that note 1 can release thermal radiation to cool to a temperature below ambient temperature Tu. In analogy to the above statements, ambient temperature refers here to any temperature, in particular the original temperature of note 1 before its cooling or the temperature of the medium immediately surrounding note 1, that note 1 approaches after a sufficiently long time period after the end of cooling.

Alternatively, heating or cooling of note 1 can be obtained by means of a hot or cold airflow. For this purpose a suitable hot-air or cold-air blower is to be provided for blowing hot or cold air onto the note. In addition, heating or cooling of note 1 can be obtained by direct contact with a hotter or colder medium. For this purpose at least one pivotally mounted cylinder that is heated or cooled is preferably provided. The cylinder can also be formed as a transport cylinder and additionally produce bank note feed in transport direction 4.

Note 1 is preferably heated or cooled homogeneously all over the partial area, i.e. the temperature reached is substantially equal at all places on the partial area. Tape 2 located on note 1 then has substantially the same temperature as the other areas of note 1 adjoining tape 2. Depending on the case of application, thermal radiation source 8 emits thermal radiation 7 continuously or in short pulses.

It is fundamentally possible to provide two or more means for heating or cooling note 1, in particular thermal radiation sources, air blowers or cylinders, to obtain very fast heating or cooling of the partial area to the desired temperature above or below ambient temperature Tu and to guarantee an especially homogeneous temperature distribution. The stated means can also be disposed on opposite sides 11 and 12 of note 1.

After traversing path S the heated or cooled partial area of note 1 reaches thermal radiation detector 6' that detects thermal radiation 5 emanating from note 1. The intensity values of detected thermal radiation 5 are a measure of particular temperatures Tx at different places on the examined partial area of note 1.

Thermal radiation detector 6' is formed here as a line detector that has individual detector elements disposed in a line, so that thermal radiation 5 emanating from note 1 can be detected in spatially resolved fashion across the partial area of note 1, in particular over the total note width. However, it is fundamentally sufficient for the inventive method for detector 6' to detect at least one temperature Tx of note 1 in the area of tape 2 and at least one temperature Tx of note 1 outside said area on note 1.

In the shown example, after traversing path S tape 2 heated by thermal radiation source 8 is located exactly in the area of thermal radiation detector 6'. Due to the different thermal properties, in particular thermal conductivities, of tape 2 located on note 1 compared with the other areas of note 1, the note has temperatures Tx in the area of tape 2 that are different from the other areas of note 1 after traversing path S, i.e. after time interval Δt after heating, since note 1 cools more slowly in the area of tape 2 than in the other areas. On the basis of detected different temperatures Tx it can be recognized whether tape or other undesirable foreign material is located on note 1. Time interval Δt between heating of note 1 and detection of thermal radiation 5 is given by the ratio of traversed path S to constant transport speed V.

For accordingly driving the apparatus and evaluating detected thermal radiation 5, control device 9 is provided.

In the example shown in FIG. 1, thermal radiation source 8 and thermal radiation detector 6' are disposed in the area of first side 11 of note 1. Alternatively or additionally, thermal radiation detector 6" can be disposed in the area of second side 12 of the note opposite first side 11. Depending on the type of bank note under test or the tape located thereon, an especially great temperature difference between tape 2 and the other areas of note 1 can be detected in the former or latter assembly, thereby further improving the recognizability.

As explained above, time interval Δt after which thermal radiation 5 is detected is given by the ratio of path S covered between thermal radiation source 8 and thermal radiation detectors 6', 6" and transport speed V. Time interval Δt can accordingly be selectively adjusted by presetting path S and/or transport speed V. Depending on the case of application, it is therefore possible in a simple way to select the length of time interval Δt so as to obtain an especially high temperature contrast between tape 2 and the other areas of note 1. It can be simultaneously taken into account that the thermal behavior of materials is determined in particular by their thermal conductivity and/or heat capacity and/or thickness. Depending on the expected differences in the thermal behavior of adhesive film and bank note, the time interval between heating or cooling and measurement is to be selected accordingly.

Line detectors 6' and 6" shown in FIG. 1 are preferably read out several times at given time intervals during the total bank note transport past them, so that when whole note 1 has passed a complete heat image thereof is obtained which can be analyzed for recognizing foreign material 2.

Figure 2:
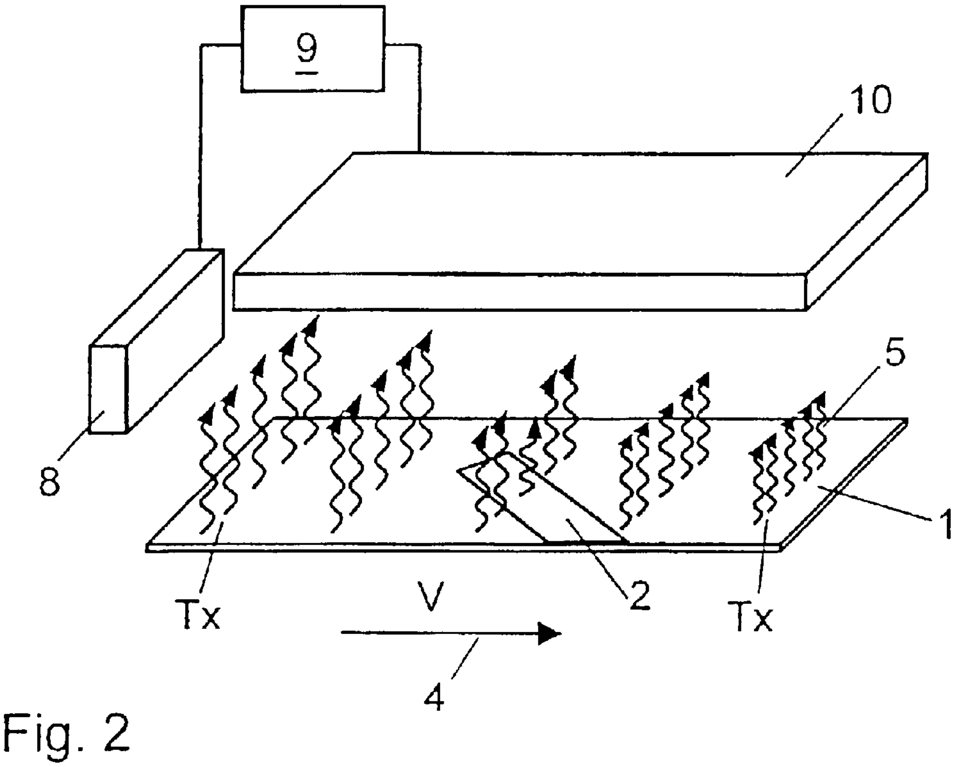
FIG. 2 shows an inventive apparatus in a further embodiment.

FIG. 2 shows a further embodiment of the invention. In contrast to the example shown in FIG. 1, area detector 10 is used instead of line detectors 6', 6" for detecting thermal radiation 5 emanating from note 1 including foreign material 2. Area detector 10 includes a plurality of detector elements disposed in a two-dimensional area. Simultaneous readout of the detector elements obtains a snapshot of temperatures Tx over over one area or optionally over total note 1, which are accordingly evaluated for recognizing foreign material 2.

Evaluation is effected here in control device 9, which also drives the apparatus in the shown example in such a way that thermal radiation is only detected after certain time interval Δt after the beginning, in particular after the end, of heating or cooling of note 1. As in the example shown in FIG. 1, time interval Δt is presettable in this case too by selecting the distance between thermal radiation source 8 and thermal radiation detector 10 and by transport speed V of note 1 in transport direction 4.

Thermal radiation detectors 6', 6" or 10 used in the shown examples have especially high sensitivity for detecting thermal radiation. Typical spectral regions of the thermal radiation detectors are between about 3 to 5 microns or about 8 to 12 microns here. The thermal radiation detectors used are thermal detectors or quantum detectors.

In thermal detectors such as bolometers, pyroelectric detectors or thermopiles, the active detector area is heated by incident thermal radiation and, depending on the functional type, a corresponding measuring signal is produced by a change in electric resistance, by surface charges or by the thermoelectric effect. Thermal detectors are suitable mainly for detecting thermal radiation in the spectral region between about 8 and 12 microns.

Preferably, the thermal radiation detectors used are quantum detectors. Here, the incident thermal radiation induces electronic transitions (photoelectric effect) which are measured as photocurrent. In contrast to thermal detectors, the detection of thermal radiation is direct, i.e. without prior heating of the detector by the thermal radiation to be detected. For this reason, quantum detectors generally have high detection sensitivity with short response times, which are typically below 100 microseconds with the detector elements used, even in the range of nanoseconds depending on the case of application. Short response times allow a fast readout of individual picture elements and therefore a high image frequency. The latter allows improved precision in the evaluation of detected temperatures Tx and thus in the recognition of foreign material such as adhesive objects, glue and joints. Quantum detectors are based for example on example on mercury-cadmium-telluride (HgCdTe) or indium-antimonide (InSb) compounds and cooled during operation by suitable cooling devices, such as a Stirling cooler. Typical spectral sensitivity ranges of quantum detectors are between about 3 and 5 microns or 8 and 12 microns.

The thermal resolution up to which temperature differences can just be recognized is below 0.1 kelvins with the detectors preferably used, so that even small temperature differences between tape and note can be reliably measured and evaluated, in particular after short time intervals Δt between homogeneous heating or cooling and detection of temperatures Tx. To further improve the recognizability of adhesive tape, high thermal resolution radiation detectors are preferably used that have a thermal resolution in the range of millikelvins, in particular between about 1 and 10 millikelvins.

Accordingly high thermal resolution permits detection of even the smallest differences in the emissivity of note 1 or tape 2 in the embodiment of the invention in which note 1 and tape 2 are in thermal equilibrium.

The statements on FIGS. 1 and 2 apply analogously to the recognition of foreign material 2 in the form of glue and/or joints on or in spliced bank notes 1. In particular, control device 9 is formed here for deriving statements about a possibly present spliced note 1, in particular a composed bank note.

In the examples of FIGS. 1 and 2 it is furthermore provided to heat or cool note 1 under examination and to detect thermal radiation 5 emanating from note 1 during and/or after heating or cooling in dependence on time. Alternatively, it can be provided to detect thermal radiation 5 emanating from note 1 under examination at a point in time, in particular in thermal equilibrium, when temperatures Tx of note 1 and foreign material 2 are substantially equal, so that differences in the detected intensity of thermal radiation 5 come primarily from different thermal emissivities $\epsilon$ of note 1 in areas with and without foreign material 2. Prior heating or cooling of the note is generally unnecessary in this embodiment of the invention. However, prior heating or cooling of note 1 may be provided, depending on the case of application. With many adhesive objects, in particular tape, the intensity differences are especially distinct in the the spectral region of thermal radiation 5 between about 3 and 6 microns, so that especially reliable recognition of adhesive objects can be obtained in this spectral region. Quantum detectors with typical sensitivity ranges between 3 and 5 microns are especially suitable here.

What is claimed is:

1. A method for recognizing foreign material such as adhesive objects, glue or joints, on or in bank notes, comprising the following steps:

detecting thermal radiation emanating from at least a partial area of a bank note, and recognizing foreign material located on or in the bank note on the basis of the detected thermal radiation.

2. The method according to claim 1, wherein the partial area of the bank note is heated or cooled.

3. The method according to claim 2, wherein the thermal radiation of the partial area of the bank note is detected after at least one time interval after the beginning of heating or cooling of the partial area.

4. The method according to claim 3, wherein the bank note is transported along a path between heating or cooling and detection of thermal radiation, the time interval after which thermal radiation is detected being preset by selecting the length of the path.

5. The method according to claim 3, wherein the time interval after which thermal radiation is detected is preset in dependence on the physical properties of the bank note.

6. The method according to claim 5, wherein the time interval after which thermal radiation is detected is preset in dependence on physical properties selected from the group consisting of thermal conductivity, heat capacity, and thickness of the bank note.

7. The method according to claim 3, wherein the thermal radiation of the partial area of the bank note is detected after the end of heating or cooling of the partial area.

8. The method according to claim 2, wherein the bank note is transported at a transport speed between heating or cooling and detection of thermal radiation, the time interval after which thermal radiation is detected being preset by selecting the transport speed.

9. The method according to claim 2, wherein the partial area is heated or cooled on a first side of the bank note, and the thermal radiation of the partial area is likewise detected on the first side of the bank note.

10. The method according to claim 2, wherein the partial area is heated or cooled on a first side of the bank note, and the thermal radiation of the partial area is detected on the second side of the bank note opposite the first side.

11. The method according to claim 2, wherein the partial area of the bank note is heated or cooled by convection.

12. The method according to claim 11, wherein the partial area of the bank note is heated or cooled by means of hot air or cold air.

13. The method according to claim 2, wherein the partial area of the bank note is heated by thermal radiation.

14. The method according to claim 13, wherein the heating of the partial area of the bank note is carried out by a heating device selected from the group consisting of a flash lamp, halogen lamp and laser.

15. The method according to claim 2, wherein the partial area of the bank note is heated or cooled by thermal conduction.

16. The method according to claim 15, wherein heating of the partial area of the bank note is carried out by contacting the partial area of the bank note with a hotter or colder medium.

17. The method according to claim 1, wherein the detected thermal radiation is used to obtain a measure of the emissivity of the partial area of the bank note, and the recognition of foreign material located on or in the bank note is effected on the basis of the obtained measure of emissivity.

18. The method according to claim 17, wherein the thermal radiation is detected at equal temperature of bank note and foreign material.

19. The method according to claim 1, wherein the thermal radiation emanating from the bank note is detected with at least one line detector and/or at least one area detector.

20. The method according to claim 1, wherein recognition of foreign material includes recognition of a bank note spliced from individual sections.

21. The method according to claim 20, wherein the foreign material recognized is glue and/or joints.

22. Apparatus for recognizing foreign material, for example, adhesive objects, glue or joints, on or in bank notes comprising a thermal radiation detecting device arranged to detect thermal radiation emanating from at least a partial area of the bank note, and a foreign material recognizing arrangement capable of recognizing foreign material located on or in the bank note on the basis of the detected thermal radiation.

23. Apparatus according to claim 22, including a heating or cooling arrangement capable of heating and/or cooling the partial area of the bank note.

24. Apparatus according to claim 23, including a control device arranged to control the apparatus in such a way that the thermal radiation of the partial area of the bank note is detected after at least one time interval after the beginning of heating or cooling of the partial area.

25. Apparatus according to claim 24, wherein said at least one time interval occurs after the end of heating or cooling of the partial area.

26. Apparatus according to claim 23, wherein the heating or cooling arrangement and the thermal radiation detection device are disposed in the area of a first side of the bank note.

27. Apparatus according to claim 23, wherein the heating or cooling arrangement is disposed in the area of a first side of the bank note, and the thermal radiation detection device is disposed in the area of the second side of the bank note opposite the first side.

28. Apparatus according to claim 23, wherein the heating or cooling arrangement is arranged so as to subject the partial area of the bank note to a hot or cold airflow.

29. Apparatus according to claim 28, wherein the heating or cooling arrangement comprises a hot-air or cold-air blower.

30. Apparatus according to claim 23, wherein the heating or cooling arrangement is arranged so as to subject the partial area of the bank note to thermal radiation.

31. Apparatus according to claim 30, wherein said heating or cooling arrangement is selected from the group consisting of a flash lamp, halogen lamp and laser.

32. Apparatus according to claim 23, wherein the heating or cooling arrangement comprises a conductive heat transfer element that is arranged to contact the partial area of the bank note for heating or cooling of same.

33. Apparatus according to claim 32, wherein said conductive heat transfer element comprises a cylinder.

34. Apparatus according to claim 22, wherein the foreign material recognizing arrangement is arranged to derive a measure of the emissivity of the partial area of the bank note from the thermal radiation detected and to recognize foreign material located on or in the bank note on the basis of the derived measure of emissivity.

35. Apparatus according to claim 34, wherein said foreign material recognizing arrangement is arranged to derive said measure of the emissivity of the partial area of the bank note under conditions when the bank note and foreign material are at an equal temperature.

36. Apparatus according to claim 22 wherein the thermal radiation detecting device includes at least one line detector and/or at least one area detector.

37. Apparatus according to claim 22, wherein the foreign material recognizing arrangement is also capable of recognizing a bank note spliced from individual sections.

38. Apparatus according to claim 37, wherein said foreign material recognizing arrangement is capable of recognizing a composed bank note.

* * * * *